(No Model.)
C. H. SHERMAN.
SHAFT ATTACHMENT FOR VEHICLES.
No. 468,936. Patented Feb. 16, 1892.
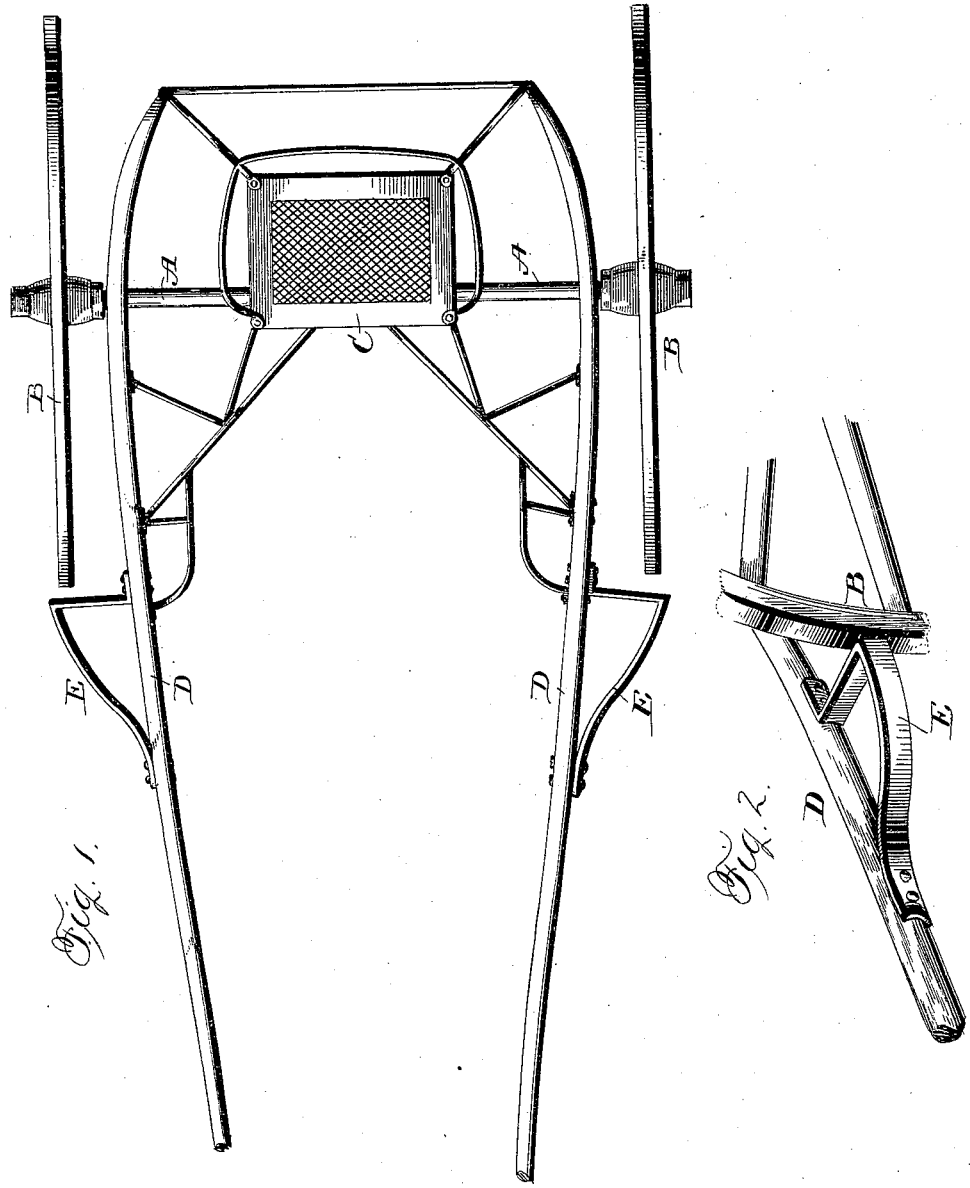

UNITED STATES PATENT OFFICE.

CHARLES H. SHERMAN, OF GLENS FALLS, NEW YORK.

SHAFT ATTACHMENT FOR VEHICLES.

SPECIFICATION forming part of Letters Patent No. 468,936, dated February 16, 1892.

Application filed August 17, 1891. Serial No. 402,898. (No model.)

*To all whom it may concern:*

Be it known that I, CHARLES H. SHERMAN, a citizen of the United States, residing at Glens Falls, in the county of Warren and State of New York, have invented certain new and useful Improvements in Shaft Attachments for Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in vehicle-shaft attachments, and it has for its object to provide a simple and effective and at the same time inexpensive device, which may be readily attached to the shaft of a sulky or other road-vehicle and which will effectually prevent the wheels of the vehicle from becoming interlocked with the wheels of other vehicles. Serious accidents have resulted from the interlocking of vehicle-wheels, more frequently, perhaps, upon the race-track, in which sulkies and the like class of racing-vehicles are employed. To obviate this danger, frame-work entirely encompassing the vehicle-wheel has been used, and it has also been proposed to partly surround the wheel with a guard which is attached at one of its ends to a cap fitted over the outer end of the hub of the wheel; but these devices have been found to be objectionable both upon account of the expense and extra weight and for the further reason that they offer an unnecessary obstruction to the removal of the wheel from the axle for the purpose of oiling or of repair.

The present invention seeks to overcome the objections above noted and to provide a simple and inexpensive device which may be readily attached to the shafts of a sulky or other vehicle and which will serve to effectually prevent the interlocking of wheels and will at the same time in no manner interfere with the removal of the wheel from the axle when desired.

The invention is clearly illustrated in the accompanying drawings, which, with the letters of reference marked thereon, form a part of this specification, and in which—

Figure 1 is a top plan view of a sulky provided with my attachment. Fig. 2 is a detail perspective view of the attachment.

Reference now being had to the details of the drawings by letter, A represents the axle, B B the wheels, C the seat, and D the shafts of a sulky of ordinary and well-known construction.

To the outer face of each of the shafts, at a point a short distance in advance of the wheel B, I attach a bracket arm or fender E, the rear end of which extends outwardly and rearwardly to a point substantially opposite the front edge of the wheel, as shown; or, if preferred, the said arm may be extended outwardly to a point corresponding with the outer end of the hub of the wheel. It will be at once seen that a guard of this kind will effectually protect the wheel against possible interlocking with the wheel of a passing vehicle, and also that the wheels of the vehicle provided with my attachment may be readily removed at any time from the axle without in any manner interfering with the attachment.

Having thus described my invention, what I claim to be new, and desire to secure by Letters Patent, is—

The herein-described attachment for vehicle-shafts to prevent the interlocking of wheels, the same consisting of a bracket or arm having one of its ends attached to the outer face of the shaft in advance of the wheel and its opposite end extended outward and rearwardly to a point substantially opposite the outer face of the wheel at its front edge, substantially as and for the purpose described.

In testimony whereof I affix my signature in presence of two witnesses.

CHARLES H. SHERMAN.

Witnesses:
F. F. PENRYN,
A. EUGENE MASON.